(12) United States Patent
Chalker et al.

(10) Patent No.: US 8,551,388 B2
(45) Date of Patent: Oct. 8, 2013

(54) PROCESS

(75) Inventors: Paul Chalker, Wirral (GB);
Christopher Sutcliffe, Liverpool (GB);
Stephen Taylor, Liverpool (GB)

(73) Assignee: The University of Liverpool, Liverpool (GB)

( * ) Notice: Subject to any disclaimer, the term of this patent is extended or adjusted under 35 U.S.C. 154(b) by 130 days.

(21) Appl. No.: 13/061,927

(22) PCT Filed: Sep. 3, 2009

(86) PCT No.: PCT/GB2009/051119
§ 371 (c)(1),
(2), (4) Date: Mar. 29, 2011

(87) PCT Pub. No.: WO2010/026426
PCT Pub. Date: Mar. 11, 2010

(65) Prior Publication Data
US 2011/0174970 A1  Jul. 21, 2011

(30) Foreign Application Priority Data

Sep. 5, 2008 (GB) .................................... 816258.8
Oct. 17, 2008 (GB) .................................... 819028.2

(51) Int. Cl.
*B29C 35/04* (2006.01)
(52) U.S. Cl.
USPC .......................... 264/401; 264/405; 264/497
(58) Field of Classification Search
USPC ........... 250/281, 283; 264/401, 407, 405, 497
See application file for complete search history.

(56) References Cited

U.S. PATENT DOCUMENTS

| | | | |
|---|---|---|---|
| 5,247,180 A * | 9/1993 | Mitcham et al. | 250/492.1 |
| 5,852,270 A | 12/1998 | Holkeboer | |
| 6,391,245 B1 * | 5/2002 | Smith | 264/401 |
| 6,500,378 B1 * | 12/2002 | Smith | 264/401 |
| 7,783,371 B2 * | 8/2010 | John et al. | 700/98 |
| 7,790,093 B2 * | 9/2010 | Shkolnik et al. | 264/401 |
| 7,831,328 B2 * | 11/2010 | Schillen et al. | 700/119 |
| 7,845,930 B2 * | 12/2010 | Shkolnik et al. | 425/375 |
| 7,892,474 B2 * | 2/2011 | Shkolnik et al. | 264/401 |
| 7,894,921 B2 * | 2/2011 | John et al. | 700/95 |
| 2003/0226965 A1 | 12/2003 | Guevremont et al. | |

FOREIGN PATENT DOCUMENTS

| | | |
|---|---|---|
| GB | 2 445 016 A | 6/2008 |
| GB | 2 451 239 A | 1/2009 |
| JP | 4-82152 | 3/1992 |
| JP | 63-37552 | 2/1998 |
| WO | WO 96/31901 A1 | 10/1996 |
| WO | WO 03/065403 A2 | 8/2003 |

OTHER PUBLICATIONS

Miriam Fico, Meng Yu, Zheng Ouyang, R. Graham Cooks, and William J. Chappell, Miniaturization and Geometry Optimization of a Polymer-Based Rectilinear Ion Trap, Analytical Chemistry, vol. 79, No. 21, Nov. 1, 2007, 8076-8082.*

(Continued)

*Primary Examiner* — Nikita Wells
*Assistant Examiner* — Johnnie L Smith
(74) *Attorney, Agent, or Firm* — Squire Sanders (US) LLP (57) ABSTRACT

The present invention relates to a process for fabricating a quadrupole mass spectrometer (QMS) component, to a monolithic quadrupole mass spectrometer or a component thereof, to a quadrupole mass filter (QMF) or quadrupole ion trap (QIT) capable of generating a hyperbolic electric field and to a modular quadrupole mass spectrometer (QMS) assembly.

16 Claims, 11 Drawing Sheets

(56) References Cited

OTHER PUBLICATIONS

International Search Report dated Feb. 17, 2010 for PCT/GB2009/051119, 6 pages.

Marshall Brain, "How Stereolithography 3-D Layering Works," dated Feb. 24, 2008, XP007911760, 6 pages, retrieved on Feb. 15, 2010 from <http://web.archive.org/web/20080224130808/http://computer.howstuffworks.com/stereolith.htm/printable>.

Anonymous, "Perfactory (R) Buyers' Guide," envisonTEC GmbH, dated Apr. 18, 2008, XP007911797, 16 pages, retrieved on Feb. 17, 2010 from <http://www.envisiontec.de/ofileadmin/pdf/buyersguide_en.pdf>.

Communication from UK Intellectual Property Office, including Search Report, for Application No. GB0816258.8, dated Feb. 27, 2009, 3 pages.

* cited by examiner

PROCESS

The present invention relates to a process for fabricating a quadrupole mass spectrometer (QMS) component, to a monolithic quadrupole mass spectrometer or a component thereof, to a quadrupole mass filter (QMF) or quadrupole ion trap (QIT) capable of generating a hyperbolic electric field and to a modular quadrupole mass spectrometer (QMS) assembly.

Mass spectrometers generally rely on introducing a sample into a vacuum chamber where it is ionized by an ion source. The ions are separated according to their charge to mass ratio before they reach a detector. In a conventional quadrupole mass spectrometer (QMS), four circular electrodes at each point of a compass create an electric field in their enclosed space. These electrodes are typically made from stainless steel up to 1 cm in diameter and 15 cm long and require precision manufacturing. In WO-A-96/31901, there are disclosed electrodes in the form of metal coated glass fibres.

Recent developments in mass spectrometers have advanced rapidly with a main focus on building fully integrated devices that can be made portable whilst maintaining good performance. To achieve this, the miniaturization of mass spectrometer components such as mass analyzers has been pursued. Reduction in the size of an analyzer promises several advantages:
1. Lower manufacturing costs because existing implementation technologies offer the possibility of mass production for separate components and for complete devices.
2. Operation at higher pressures due to shorter length of the ion mean free path.
3. Use of less robust and less expensive vacuum systems due to smaller sized devices and high pressure operation.
4. Lower power consumption with the possibility to operate with a low power battery to achieve the lower electrode voltages needed to generate requisite electric fields.
5. Potential for the whole mass spectrometry system to be portable.

Miniaturization of mass spectrometers is presently carried out by microelectromechanical systems (MEMS) based mainly on semiconductor microengineering with metal deposits. Since complex electrode geometries such as hyperbolic cannot be machined at micro-scale using MEMS, simpler geometries such as cylindrical and planar are used to give an approximation to a hyperbolic field.

One of the first miniature analyzers constructed using MEMS was a quadrupole mass filter (QMF) with cylindrical electrodes [Taylor S et al. Silicon based Quadrupole Mass Spectrometry using Microelectromechanical Systems. *J. Vac. Sci. Technol. B* 2001, 19, 557-562]. Other miniature mass analyzers include a time-of-flight mass filter [Wapelhorst E et al: Complex MEMS: a Fully Integrated TOF Micro Mass Spectrometer. *Sensors and Actuators A* 2007, 138, 22-27], a cylindrical micro ion trap that easily forms arrays [Blain M G et al: Towards the Hand-Held Mass Spectrometer: Design Considerations, Simulation and Fabrication of Micrometer-Scaled Cylindrical Ion Traps. *Int. J. Mass Spectrom.* 2004, 236, 91-104; Pau S et al: M. Microfabricated Quadrupole Ion Trap for Mass Spectrometer Applications. *Phys. Rev. Lett.* 2006, 96, 120801; and Van Amerom F H W et al: Microfabrication of Cylindrical Ion Trap Mass Spectrometer Arrays for Handheld Chemical Analyzers. *Chem. Eng. Comm.* 2008, 195, 98-114], a rectilinear ion trap with planar electrodes [Song Y et al: Novel Linear Ion Trap Mass Analyzer Composed of Four Planar Electrodes. *J. Am. Soc. Mass Spectrom.* 2006, 17, 631-639] and a halo ion trap [Austin D E et al: Halo Ion Trap Mass Spectrometer. *Anal. Chem.* 2007, 79, 2927-2932]. Ion source miniaturization has also advanced with the realization of a carbon nanotube electron impact ion source [Bower C A et al: On-Chip Electron Impact Ion Source using Carbon Nanotube Field Emitters. *Appl. Phys. Lett.* 2007, 90, 124102].

The present invention is based on the exploitation of selective curing of a curable material to fabricate components of a quadrupole mass spectrometer (QMS). In particular, the present invention relates to a process for fabricating monolithic (eg unitary) components of a QMS which may be imparted with modularity and in which may be deployed highly accurate profiles which (is use) lead to the attainment of hitherto unachievable electric field profiles.

Viewed from a first aspect the present invention provides a process for fabricating a quadrupole mass spectrometer (QMS) component comprising:
(a) preparing a bed of curable material;
(b) selectively exposing to incident radiation each of a plurality of x-y layers of the bed of curable material sequentially in the z-direction to produce x-y layers of selectively cured material which are characteristic of the x-y layers of the QMS component.

By exploiting a small stepwise increase in the z-direction, a small feature size related to the volumetric pixel (the pixel dimension x-y together with the thickness z) is achievable to fabricate the QMS component to a high degree of accuracy. The process of the invention thus permits the fabrication of miniature QMS components straightforwardly, rapidly and at low cost with good tolerances and smooth surfaces. These advantages promote the utility of mass spectrometry, in particular in field applications such as instant medical diagnosis, water and environmental analysis and detection of oil, natural gas and explosives.

The incident radiation may be characterised by an image which is characteristic of an x-y layer of the QMS component.

Preferably step (b) includes re-characterising (eg digitally re-characterising) sequentially the incident radiation commensurate with the sequential exposure of the plurality of x-y layers in the z-direction.

Unlike a conventional lithographic technique that requires (at significant cost) a specific mask per layer, this embodiment of the process of the invention effectively reprograms the "mask" for each successive layer thereby deploying a dynamic masking regime to build a controlled layer-by-layer geometry.

Re-characterisation may occur in response to an image-carrying signal (eg a digital image-carrying signal). The image-carrying signal may be generated by a modelling technique (eg a computer-generated model from CAD data or a scan file). Re-characterisation may be computer-controlled.

Step (b) may be carried out by a source of radiation and a digital modulation device for modulating the radiation from the source of radiation in response to a digital image-carrying signal to output the incident radiation. The digital modulation device is preferably a digital micromirror device (DMD). Such devices are available from Texas Instruments for video applications.

The x-y layers of step (b) typically have a thickness of 15 microns. For this purpose, step (b) may proceed stepwise using a stepper motor to step the bed of curable material in the z-direction sequentially.

The source of radiation may be incandescent light, laser radiation or an LED radiation.

The curable material is typically a curable resin. The curable material may be a photopolymer. The curable material may be an acrylic, epoxy or wax-based resin. An example is polymethylmethacrylate (PMMA).

The QMS component may be one or more of an elongate rod (which is operable as an electrode), a securing pin, a quadrupole mass filter (QMF), an ion source (eg a spark-gap ion source, a plasma-based ion source, a radioisotope ion source or an electron impact ion source), an ion collector, an ion detector, a QMF pre-filter, a pre-filtered mass analyzer, an ion trap (such as a cylindrical or quadrupole ion trap), an array of mass analyzers (eg a trap array), an ion source lens, a housing or a component of any of the aforementioned.

In a preferred embodiment, the QMS component is a component of a quadrupole ion trap mass spectrometer (QITMS). The QMS component may be a linear quadrupole ion trap or a 3D quadrupole ion trap.

In a preferred embodiment, the QMS component is a quadrupole mass filter (QMF). The QMS component may be a QMF composed of a housing portion and four elongate electrode portions parallel and mutually spaced apart in the housing portion.

In a preferred embodiment, the process of the invention is used to fabricate a QMS per se composed of one or more QMF portions. A reliable and fully integrated QMS with a monolithic single QMF or array of QMFs significantly promotes in field utility in a number of different technology areas.

The QMS component may be an ion source lens composed of a lens portion and an inter-lens insulator portion.

The QMS component may be a spark-gap ion source composed of electrode portions, wherein in use ions are created within gaps in the electrode portions.

The QMS component may be a QMF pre-filter with a pre-filter electrode portion.

The QMS component may be a QMF post-filter with a post-filter electrode portion.

The QMS component may be a monolithic QMF, QMF pre-filter and QMF post-filter. The elongate electrode portions, pre-filter electrode portion and post-filter electrode portion may be defined by one or more common elongate rods. The common elongate rod may be coated to define conductive regions for the electrode portions of each of the QMF, QMF pre-filter and QMF post-filter.

The QMS component may be a linear ion trap with an ion trap electrode portion.

The QMS component may be a cylindrical ion trap with an ion trap electrode portion.

The QMS component may be a hyperbolic ion trap with an ion trap electrode portion.

The QMS component may be a trap array with a trap array electrode portion.

The QMS component may be a monolithic linear ion trap and trap array. The ion trap electrode portion and trap array electrode portion may be defined by one or more common elongate rods.

Preferably the QMS component is an elongate rod (which is operable as an electrode), a housing for the elongate rod or a securing pin.

In a preferred embodiment, the QMS component is an elongate rod. The elongate rod may have a circular or non-circular profile. In a preferred embodiment, the elongate rod has a non-circular profile (eg a square, hyperbolic or complex profile). Preferably the profile of the elongate rod is at least partially substantially hyperbolic.

The elongate rod may be multi-faceted. The elongate rod may have multiple (eg twin) substantially radial flanges which may be divergent. The elongate rod may be substantially anvil-shaped.

Typically the length of the elongate rod is 50 mm or more.

In a preferred embodiment, the QMS component is a housing comprising:
an elongate slot in which a plurality of elongate rods are parallel mountable axially in a mutually spaced apart disposition so as to define therebetween an ion receiving volume.

Preferably in the elongate slot are parallel mountable axially a plurality of elongate rods in a mutually spaced apart disposition whereby a first part of each elongate rod is freely inward facing and a second part of each elongate rod is adapted to key to a part of the circumference of the elongate slot in the housing.

The geometry of the circumference of the elongate slot may be complex. The circumference of the elongate slot may be multi-recessed.

Preferably the component is a housing comprising:
an elongate slot in which four elongate rods are parallel mountable axially in a mutually spaced apart disposition (preferably a substantially square disposition) so as to define therebetween an ion receiving volume.

Preferably in the elongate slot are parallel mountable axially four elongate rods in a mutually spaced apart disposition whereby in use to generate in the ion receiving volume a hyperbolic (preferably substantially ideal hyperbolic) electric field.

Preferably in the elongate slot are parallel mountable axially four elongate rods in a mutually spaced apart disposition whereby a first part of each elongate rod is freely inward facing, wherein the profile of the first part of each elongate rod is substantially hyperbolic. Particularly preferably the second part of each elongate rod is adapted to key to a quadrantal circumference of the elongate slot in the housing. By keying the second part to the quadrantal circumference of the elongate slot, it is possible to achieve precise mutual location and orientation of the four elongate rods in the housing which is use exhibits a hitherto unachievable substantially ideal hyperbolic electric field profile.

The profile of the second part of the elongate rod may substantially match the profile of the quadrantal circumference of the elongate receiving slot in the housing. The second part of the elongate rod may be (or comprise) a male portion and the quadrantal circumference of the elongate slot may be (or comprise) a female portion mateable with the male portion.

In a preferred embodiment, the process further comprises:
(c) slotting a plurality (eg four) elongate rods prepared consecutively by steps (a) and (b) as hereinbefore defined in the elongate slot of a housing prepared by steps (a) and (b) as hereinbefore defined.

By exploiting the process of the invention to fabricate elongate rods with precise profiles and a housing with a slot for precise alignment of the elongate rods in the axial direction, it is possible to fabricate accurately an inscribed radius of 2 mm or less. Preferably the inscribed radius is less than 1 mm (eg about 0.9 mm).

The housing may be recessed to receive a QMS component as hereinbefore defined.

Preferably the housing is recessed to receive an ion source (eg a spark gap or electron ion source). The ion source may be prepared by steps (a) and (b) as hereinbefore defined.

Preferably the housing is recessed to receive an ion detector (eg a Faraday cup). The ion detector may be prepared by steps (a) and (b) as hereinbefore defined.

The housing may be fabricated on a vacuum flange.

Preferably the component is a securing pin insertable through a radial bore in the housing into a radial bore in an elongate rod to secure the elongate rod in the housing. The securing pin may be conductive to assist in electrical connectivity of the elongate rod.

Preferably step (c) further comprises:
(c1) inserting a securing pin prepared by steps (a) and (b) as hereinbefore defined through a radial bore in the housing into a radial bore in the elongate rod to secure the elongate rod in the housing.

In a preferred embodiment, the process further comprises:
(d) depositing a coating of a conducting material on the surface of each elongate rod to render the elongate rod conductive.

Preferably step (d) is carried out selectively on the surface of the first part of the elongate rod (eg by masking).

Preferably step (d) is carried out after step (c). This permits the housing to act as a mask so that the coating is deposited selectively on the surface of the first part of each elongate rod.

The conducting material may be metal-based. For example, the conducting material may be elemental metal. The metal may be gold or silver.

Metal deposition may be carried out by thermal evaporation of a metal (eg a metal wire) in vacuum or by metal sputtering. The metal coating may have a thickness in the range 0.1 to 3 microns.

Viewed from a further aspect the present invention provides a monolithic quadrupole mass spectrometer or a component thereof obtainable or obtained by a process as hereinbefore defined.

The monolithic QMS or QMS component may be as hereinbefore defined.

In a further patentable aspect, the present invention is based on the attainment of a hitherto unachievable substantially ideal hyperbolic electric field profile by a QMF characterized by a small inscribed radius.

Viewed from a yet further aspect the present invention provides a quadrupole mass filter (QMF) or quadrupole ion trap (QIT) capable of generating a hyperbolic (preferably substantially ideal hyperbolic) electric field comprising:
a housing including an elongate slot;
four elongate rods parallel mounted axially in a mutually spaced apart disposition in the elongate slot, wherein a profile of a first part of each elongate rod is substantially hyperbolic and is freely inward facing, wherein the inscribed radius ($r_o$) of the four elongate rods is less than 1 mm.

The attainment of a hyperbolic electric field permits the QMF to exhibit higher transmission, higher resolution and a less distorted (more ideal) peak shape, whilst accommodating higher manufacturing tolerances.

Preferably the QMF or QIT is capable of generating a substantially ideal hyperbolic electric field.

Preferably the QMF or QIT in use generates an electric field described by the potential variation:

$$\phi(x, y, z) = \phi_0 \frac{(x^2 - y^2)}{2r_0^2}$$

Figure 8:
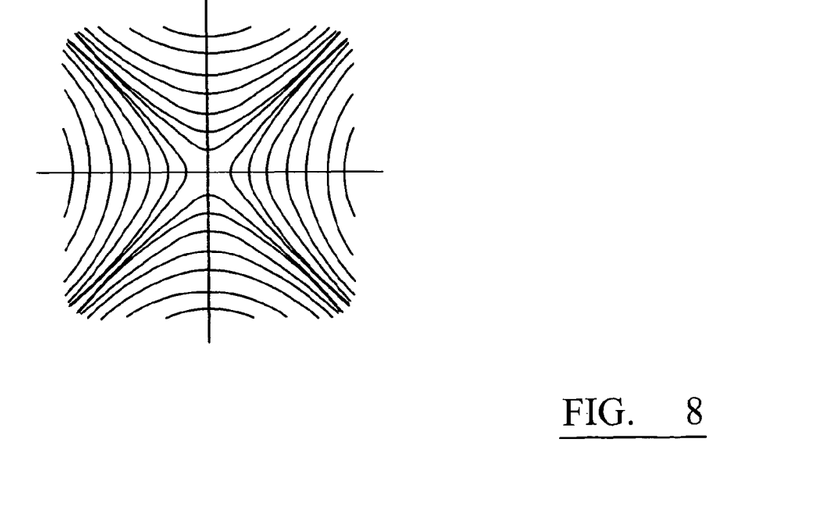
FIG. 8. A hyperbolic electric field exhibited by an embodiment of the hyperbolic QMF of the invention.

Preferably the QMF or QIT in use generates an electric field substantially as illustrated in FIG. 8.

Preferably the inscribed radius ($r_o$) is in the range 400 microns to 0.9 mm, preferably 0.1 to 0.9 mm.

The average resolution R (m/Δm) at 50% of the peak height achievable by the QMF of the invention is typically 20 or more, preferably 30 or more, more preferably 40 or more, especially preferably 50 or more.

The housing may be as hereinbefore defined. The elongate slot may be as hereinbefore defined. Each of the four elongate rods may be as hereinbefore defined.

The QMF or QIT of the invention may be obtained or obtainable by a process as hereinbefore defined, by electrode-discharge machining, by lithography or by injection moulding.

Preferably the QMF or QIT of the invention is obtained or obtainable by a process as hereinbefore defined.

Preferably the QMF or QIT of the invention is obtained or obtainable by a method as hereinafter defined.

In a yet further patentable aspect, the present invention seeks to overcome shortcomings in conventional mass spectrometers by providing a modular quadrupole mass spectrometer assembly which by virtue of its inherent versatility is inexpensive to assemble whilst offering the possibility of use in situ.

Viewed from a still yet further aspect the present invention provides a modular quadrupole mass spectrometer (QMS) assembly comprising:
a first module being a housing, wherein the housing includes an elongate slot; and
a second module being four elongate rods, wherein a profile of a first part of each elongate rod is substantially hyperbolic, wherein the four elongate rods are parallel mountable axially in the elongate slot in a mutually spaced apart disposition whereby the first part of each elongate rod is freely inward facing and a second part of each elongate rod is adapted to key to a quadrantal circumference of the elongate slot in the housing.

The versatility of the modular QMS assembly is such that the individual modules may be supplied to the end user with the intention of putting the invention into effect in situ (optionally in combination with other components which may already be available to the user).

Preferably when the second module is mounted in the first module the first and second modules are electrically connected to a common electrical flange.

Preferably the first module is mounted on a vacuum flange.

Preferably the housing includes a first recess and the modular QMS assembly further comprises:
a third module being an ion source receivable in the first recess.

Preferably when the third module is received in the first recess the first and third modules are electrically connected to a common electrical flange. The ion source is preferably a spark ion source.

Preferably the housing includes a second recess and the modular QMS assembly further comprises:
a fourth module being an ion detector receivable in the second recess.

Preferably when the fourth module is received in the second recess the first and fourth modules are electrically connected to a common electrical flange. The fourth module may be a Faraday cup.

Preferably each module of the modular QMS assembly is fabricated by a process as hereinbefore defined.

Typically modules are assemblable by push-fit (eg x-y push fit or z push fit). This may be achieved by appropriate male/female connectivity.

The present invention will now be described in a non-limitative sense with reference to the accompanying Figures in which.

EXAMPLE 1

The following Example describes methods that were used prior to fabricating a QMF according to the invention and performance results after testing it.

Modelling

Analytical and numerical modeling of electrostatics is useful and often essential when designing ion sources and mass analyzers because it generates results that could appear in a real system. A numerical model is used to produce individual mass peaks or a complete mass spectrum and it can support any type of ion source, together with a QMF with hyperbolic, cylindrical or square electrodes. The model works by coupling a CPO3D program [available at www.electronoptics.com] with the Liverpool QMS-2 program [Gibson J R et al: Detailed Simulation of Mass Spectra for Quadrupole Mass Spectrometer Systems. *J. Vac. Sci. Technol. A* 2000, 18, 237-243]. CPO is a commercial electrostatic simulation package based on the boundary-element method (BEM) which has been proven to be more accurate than the finite-element method (FEM) and the finite-difference method (FDM) for modeling electrostatic lenses [Cubric D et al: Comparison of FDM, FEM and BEM for Electrostatic Charged Particle Optics. *Nucl. Instr. Meth. Phys. Res. A* 1999, 427, 357-362]. It has also been shown that CPO is more accurate than SIMION (FDM) for modeling miniature ion traps in free space [Brkić B et al: High-Fidelity Simulations of Ion Trajectories in Miniature Ion Traps using the Boundary-Element Method. *Phys. Rev. A* 2006, 73, 012326]. This is mainly because BEM uses only the surface of the electrodes to define the grid points for calculating potentials whilst FEM and FDM also use the space enclosed by the electrodes. In this way, BEM enables faster computation and greater accuracy even with a small number of electrode segments which are used to adjust the accuracy of simulations. Another advantage is that the number of segments can be defined for different electrode regions and therefore it is possible to have a larger number of segments for most critical regions and a smaller number of segments for regions where high accuracy is not needed.

QMS-2 is a 2D simulation package for a QMF developed by the University of Liverpool and was initially based on FDM. More recently, it used BEM for calculating electric fields and potentials. It supports QMFs with hyperbolic, cylindrical or square electrodes giving accurate performance predictions [Gibson J R et al: Prediction of Quadrupole Mass Filter Performance for Hyperbolic and Circular Cross Section Electrodes. *Rapid Commun. Mass Spectrom.* 2000, 14, 1669-1673; and Gibson J R et al: Asymmetrical Features of Mass Spectral Peaks Produced by Quadrupole Mass Filters. *Rapid Commun. Mass Spectrom.* 2003, 17, 1051-1055]. The purpose of QMS-2 is to generate individual mass peaks and full mass spectra for given ion masses within a specified mass range for 1, 2 and 3 stability zones. This is achieved by defining QMF dimensions and drive parameters (voltages and frequency) as well as initial ion oscillation parameters (positions, energies and velocity components). Initial ion parameters in QMS-2 can either be defined by setting constant initial energy for desired ions and setting the angular spread in the direction at which ions enter the QMF. A more customised approach can be used by modeling ion motion within a given ion source using programs such as CPO and SIMION to obtain entrance ion parameters. This gives better correspondence with a real system, especially for ion energies that are directly dependent on the voltages applied to the ion source lenses.

Figure 1:
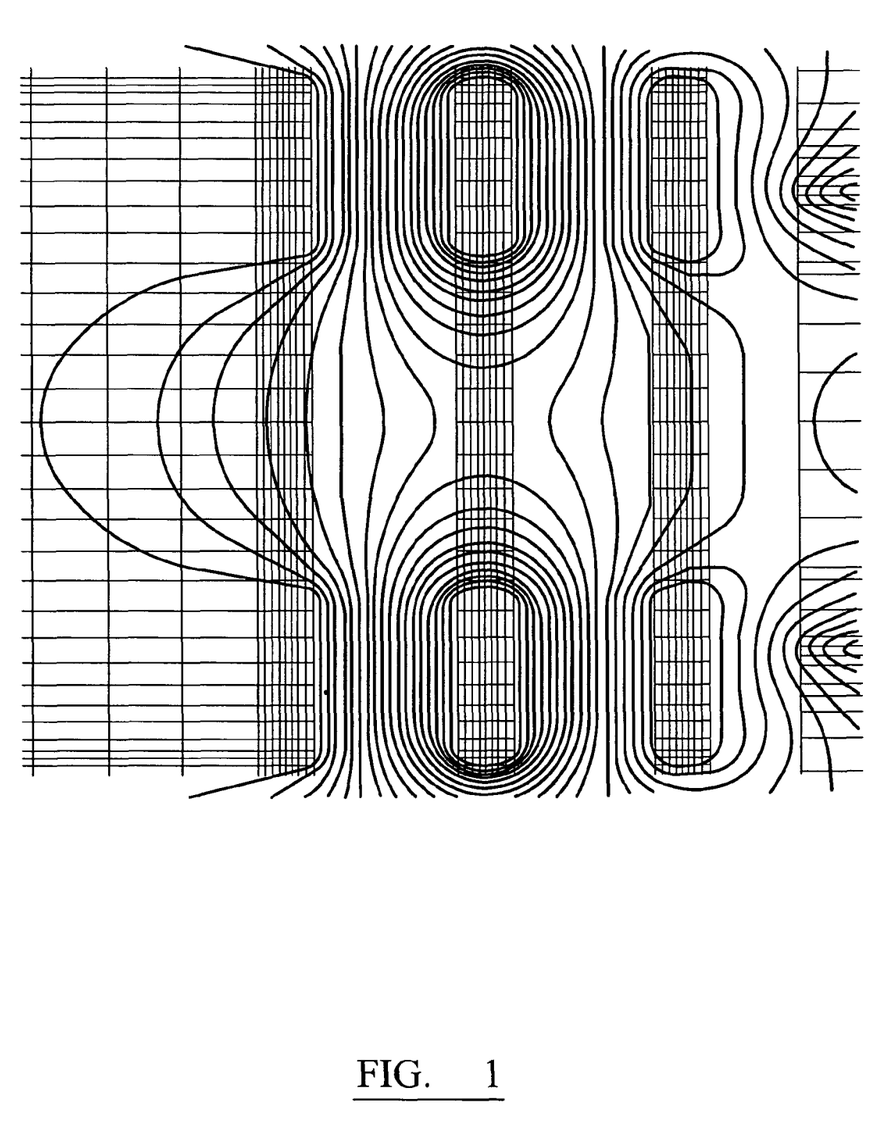
FIG. 1. Equipotential contours in the zx/zy plane for an electron impact ion source (EIIS) used for testing a hyperbolic QMF fabricated according to an embodiment of the process of the invention.

For this example, CPO was used to simulate ion trajectories for the electron impact ion source (EIIS) and QMS-2 was used for the hyperbolic QMF built according to the invention. FIG. 1 shows equipotential contours for the EIIS that was used in this example. Quadrupolar potential can be seen within the region of the ion extraction lens that has negative DC voltage applied to it. The ion cage and the entrance lens are held at a positive DC voltage which is significantly smaller in magnitude than that of the extraction lens. The exit lens is grounded. A hyperbolic QMF was also added to CPO simulation of the EIIS to include the effect of the fringing fields when ions enter the mass filter and space charge (SC) was enabled between ions within the ion source.

Design

Figure 2:
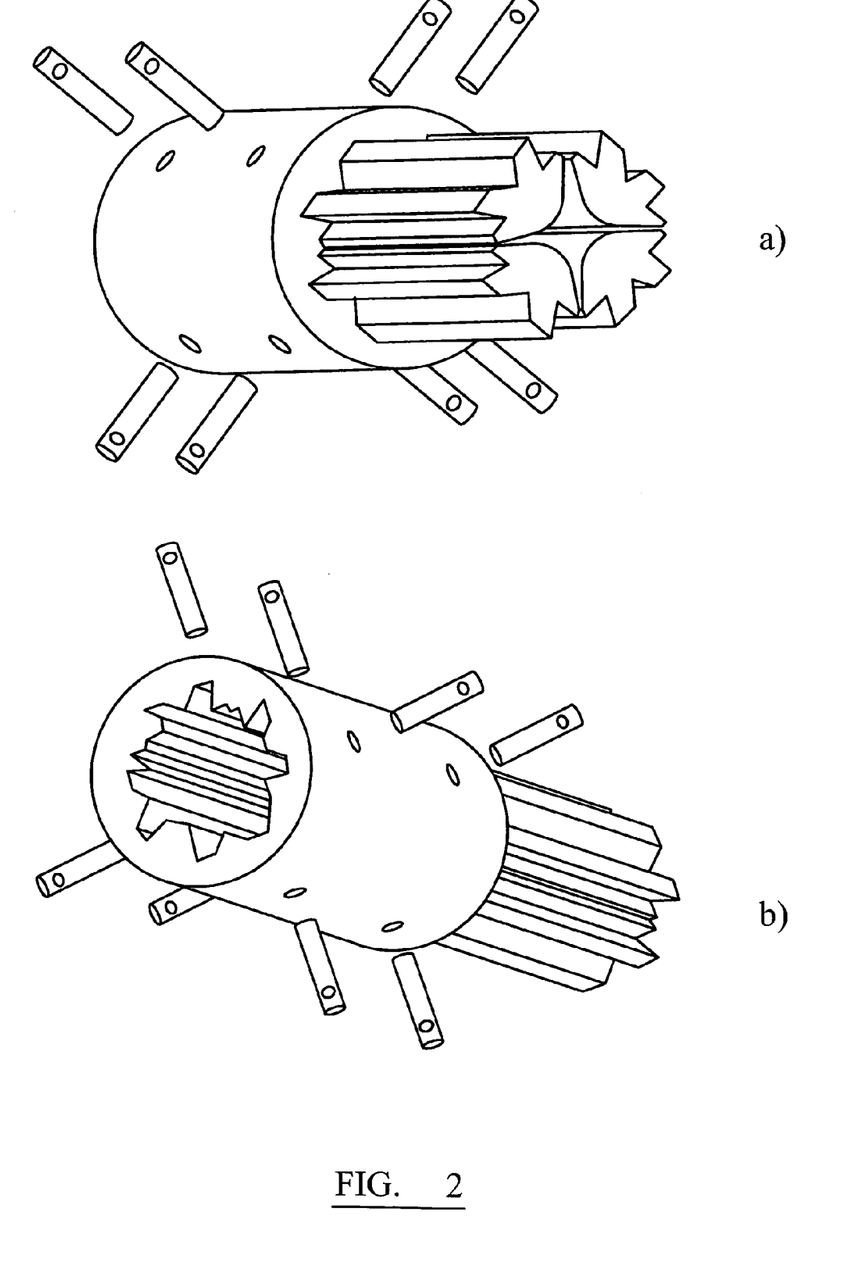
FIG. 2. CAD design drawings for a hyperbolic QMF showing the electrode design (a, top) and the design of the electrode slot in the housing (b, bottom)

Before fabrication of the hyperbolic QMF, a detailed CAD design was prepared in Pro/ENGINEER to define dimensions for each component to be built. CAD drawings were loaded directly into a machine which then manufactured desired 3D shapes according to the drawing. FIGS. 2a and b show design drawings for the hyperbolic QMF including the electrodes, electrode housing and pins. The shape of the slot on the housing was carefully chosen to provide a tight fitting for the elongate rods in order to establish a good alignment and separation. This is especially important for QMFs where small displacement of the electrodes can severely reduce the performance of the instrument [Taylor S et al: Prediction of the Effects of Imperfect Construction of a QMS Filter. *J. Mass Spectrom.* 2008, 43, 609-616]. The pins enable electrical connection to the electrodes through tiny holes and secure the electrodes within the housing.

Fabrication Technique

Fabrication of the hyperbolic QMF was carried out using a digital micromirror device (DMD). In the present Example, a commercial EnvisionTec Perfactory system was used to fabricate pins, electrodes and the housing and is illustrated schematically in FIG. 7. The system 1 comprises a curable resin container 4 with a transparent floor, a DMD chip 5, a focussing lens 6, a light source 7 and a stepper motor for movement of a build platform 2 to form a build 3 in the z direction. The DMD chip 5 is part of a DMD chassis with a lens mounting, associated electronics and a cooling unit.

Figure 7:
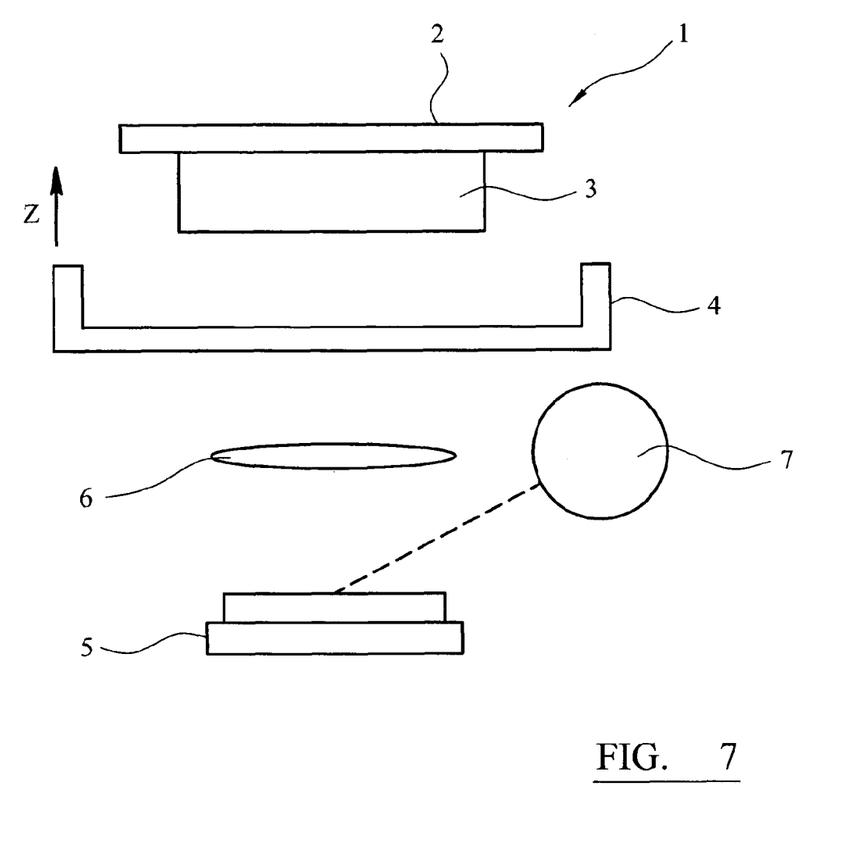
FIG. 7. Schematic illustration of a system for performing the process of the invention.

The pre-processing of the computer generated model for the process of the invention is identical to a generic RP model which makes it well suited for mass production. Two colour bitmap images corresponding to each individual build layer are generated. These bitmap images are then used to actuate individual mirrors on the DMD 5 causing them to reflect light toward the curable resin container 4 where polymerisation occurs.

Photopolymers contain photo-inhibiters which segregate monomers preventing them from joining. Upon exposure to radiation of a given wavelength these inhibiters are broken down and polymerisation can occur. To allow this process to be repeated a fresh layer of uncured polymer must be under most to the transparent floor. This requires that the previously cured layer is elevated by an amount corresponding to one build layer. To achieve this, the stepper motor translates by a distance $\Delta z$ allowing the liquid polymer to seep under the previously cured layer. A further exposure causes the current layer to adhere preferentially to the previously cured layer. The appropriate translation takes place again and the process is repeated a number of times corresponding to the required number of build layers through the height of the geometry.

The pins and electrodes were gold coated with an Edwards E306A Coating System which has a thermal evaporator.

The resolution of the system is anisotropic due to the fact that resolution limiting parameters are different in the coordinate axis with reference to each build layer. Geometries realised in this way can be thought of as consisting of a multitude of voxels (volumetric pixels). These discrete 'building blocks' have their dimensions forced upon them by the dimensions of each mirror mounted on the DMD 5 (after focussing as observed at the resin floor) corresponding to the x-y resolution and in the z direction by the smallest possible translation of the stepper motor.

Experimental Setup

The equipment used to test the performance of the hyperbolic QMF prepared by the process of the invention included:
1. Leybold Ionivac vacuum gauge—used to check that a good base level is achieved and to monitor the pressure when adding a sample of a gas.
2. Edwards two-stage rotary pump—used to reduce pressure in a vacuum system from atmospheric (750 Torr) to approximately $1\times10^{-1}$ Torr.
3. Edwards turbomolecular pump—used to reduce pressure from $1\times10^{-1}$ Torr to approximately $5\times10^{-6}$ Torr.
4. Ammeter—used to monitor the current through the filament to check that the filament is on and not burned out and that it is emitting electrons to the cage.
5. Micro ammeter—used to monitor the current on the cage.
6. Electronic control unit (ECU)—used to control the ion source voltages, to provide RF+DC drive voltages for the mass filter, to measure the current in the Faraday cup detector and to send the signal to the computer to be plotted. The ECU is custom designed and is suitable for working experimentally with mass filters because the user has full control over all the settings.

Results and Discussion

The hyperbolic QMF fabricated according to the invention in this Example was designed to fit into an existing vacuum flange and metal housing with an existing electron impact ion source (EIIS) and detector. The QMF had $7'_0=2$ mm (where $r_0$ is half of the distance between the opposing electrodes of the QMF). The length of the rods was 50 mm. A commercial EIIS built by conventional engineering was used to test the QMF.

The EIIS consisted of a cylindrical cage and three plate-type lenses used for ion focusing and extraction. The cage had a diameter of 6 mm and a length of 10 mm. All three lenses had a thickness of 0.3 mm and a separation of 0.8 mm. The entrance lens was connected to the cage and the exit lens was separated from the QMF by 0.5 mm. Each lens had $r_e=1.5$ mm (where $r_e$ is the exit aperture radius). The size of the EIIS exit aperture ($r_e=0.75r_0$) was not optimal for the size of the QMF to obtain good ion transmission and resolution. The purpose of using the existing EIIS was to save testing time and to prove that the QMF operated as a mass spectrometer with average resolution R (m/$\Delta$m) greater than 20 at 50% of the peak height. A larger length of QMF rods would significantly improve resolution but 50 mm length was taken to fit the existing metal housing.

For testing, the QMF was driven with an RF amplitude of 17.66 V at a frequency of 3.686 MHz with a DC scan voltage of 2.96 V. The ion source cage and the entrance lens were held at 3V, the extraction lens at −40V and the exit lens at 0V. The emission current for ionization was 0.6 mA and the operating pressure was $9.9\times10^{-5}$ Torr. Before testing, simulations were carried out to obtain the mass peak for $^4\text{He}^+$ ions in order to estimate the highest achievable resolution for the given QMF and EIIS with specified driving parameters. Firstly, ion motion within the ion source was modeled in CPO with $^4\text{He}^+$ ions starting their oscillation within the cage at an energy of 0.01 eV. A cylindrical ion beam was defined where 40% of the ions from the cage successfully passed through the lenses and entered the QMF at 3.17 eV on average. The effects of space charge between the ions in the ion source and the fringing fields when ions reach the QMF were also included. Since CPO does not support a large number of ions (up to 4,000 per quadrant), the utility program was used to generate a larger number of ions to enter the QMF to obtain a good peak. The program used parameters such as coordinates, velocity components and energies from the ions that passed through the lenses and proportionally generated parameters for 40,000 ions. This is because 40% of ions passed through the source lenses and it was assumed that there were 100,000 ions in the cage. Hence 40,000 ions were injected into the hyperbolic QMF in the QMS-2 program.

Figure 3:
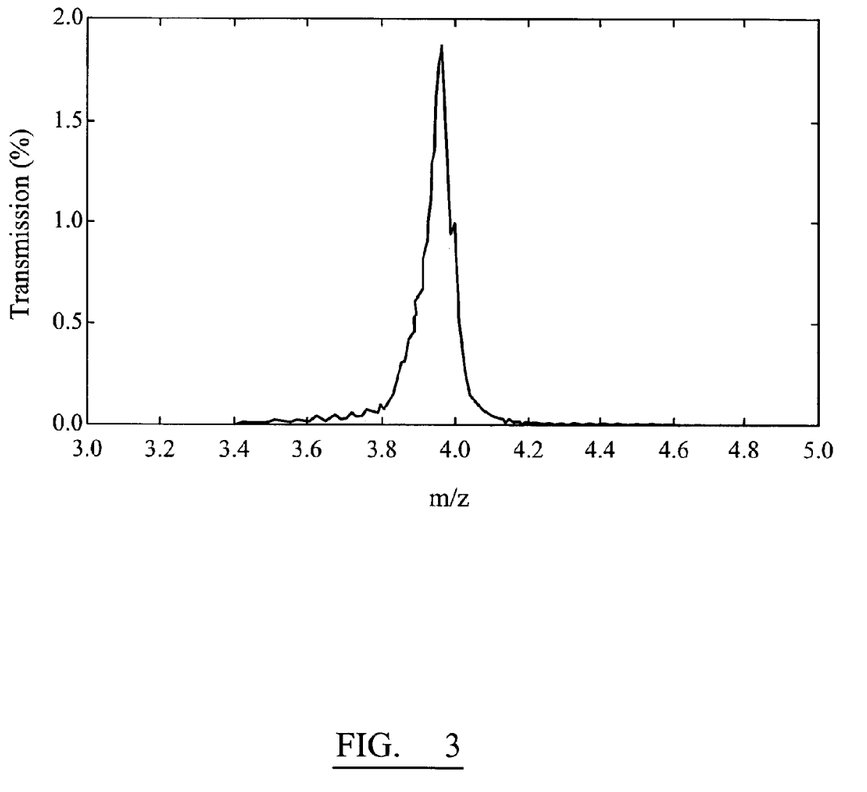
FIG. 3. Simulated mass peak for $^4He^+$ ions oscillating within the hyperbolic QMF generated by coupling CPO and Liverpool QMS-2 programs.

To obtain a mass peak with optimal resolution, the resolution setting η in the QMS-2 was defined to be 99.99% (where η is expressed as a ratio between the DC voltage U and the amplitude of the AC voltage V). The value for V was kept fixed and corresponded to the peak of the stability diagram, while the value for U was varied to change the resolution value. FIG. 3 shows the $^4\text{He}^+$ peak obtained from QMS-2 for the QMF operating in the zone 1 stability region. The resolution at 50% of the peak height is 70 for mass 4 which is theoretically the highest achievable for the given setup. Obtaining mass filter resolution numerically can be very useful before fabrication so that expectations can be determined. Modeling allows adjustment of the design of the ion source and mass filter in order to satisfy requirements for a given application.

Figure 4:
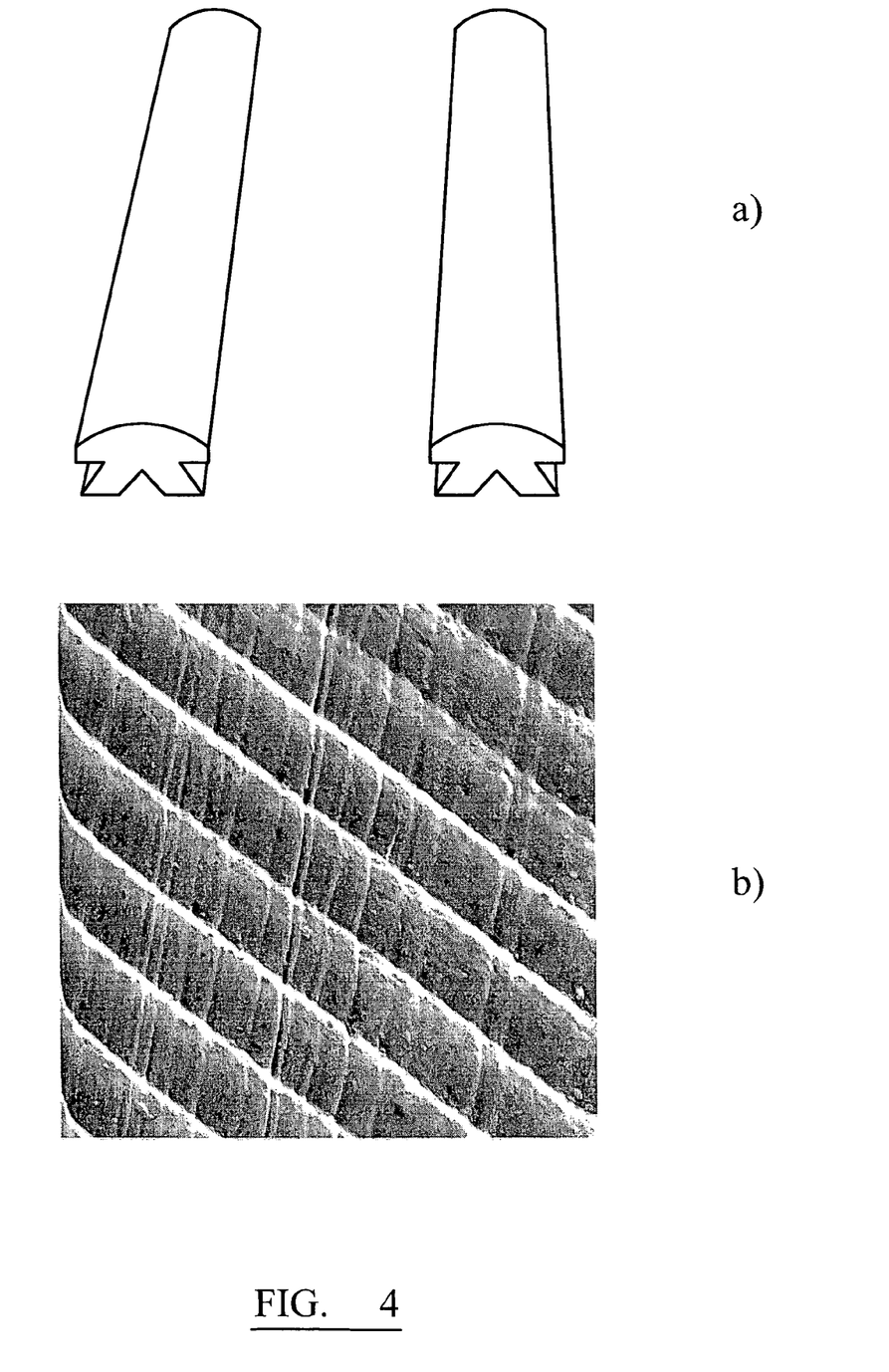
FIG. 4. Gold coated and non-coated elongate rod of the QMF (a, top) and microscopic image of the rod to show the surface roughness (b, bottom)

FIG. 4a shows an uncoated and coated QMF rod after fabrication. The thickness of the gold coating is approximately 1 μm and the resistance of the conducting electrodes from one end to another was approximately 40Ω. By improving the gold coating, the resistance can be further reduced to give more accurate driving voltages. FIG. 4b shows a scanning electron microscope (SEM) picture of the enlarged part of the plastic rod. The surface roughness of the rods is 1.5 microns. The gold coating does not contribute significantly to surface roughness. This is especially important for miniature mass analyzers where if electrodes are not smooth enough, patch potentials can increase ion motional heating causing distortion of ion motion [Turchette Q A et al: Heating of Trapped Ions From the Quantum Ground State. *Phys. Rev. A* 2000, 61, 063418].

Figure 5:
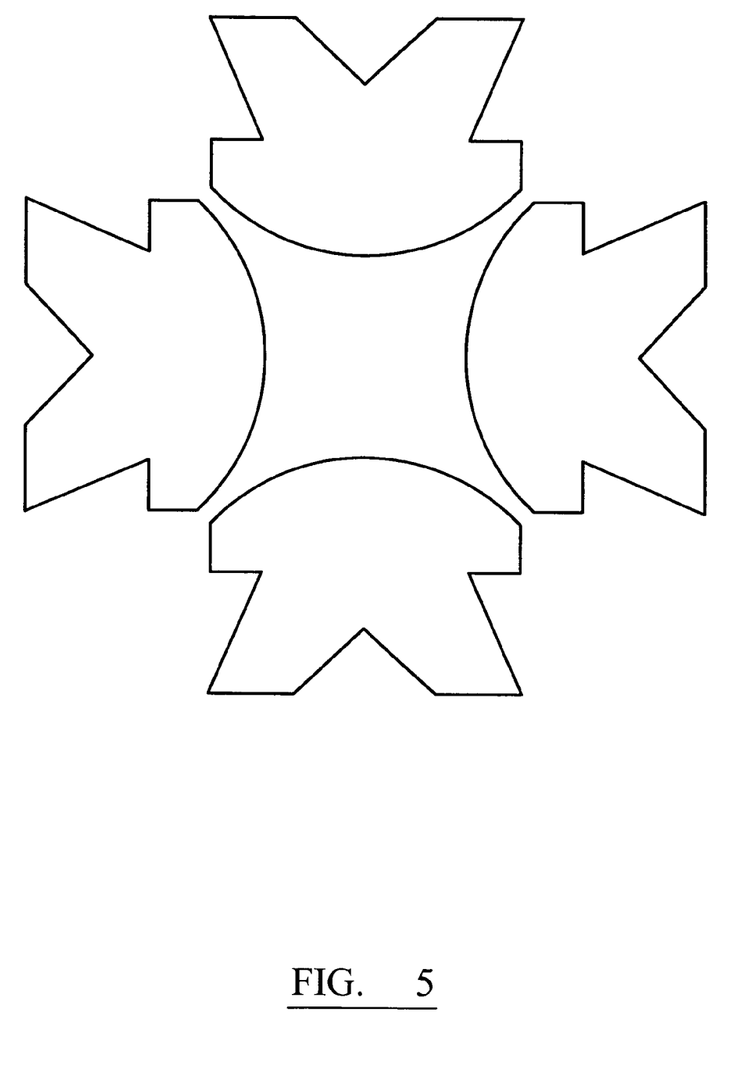
FIG. 5. Cross section of the QMF prototype prepared according to the process of the invention showing the electrode alignment.
Figure 6:
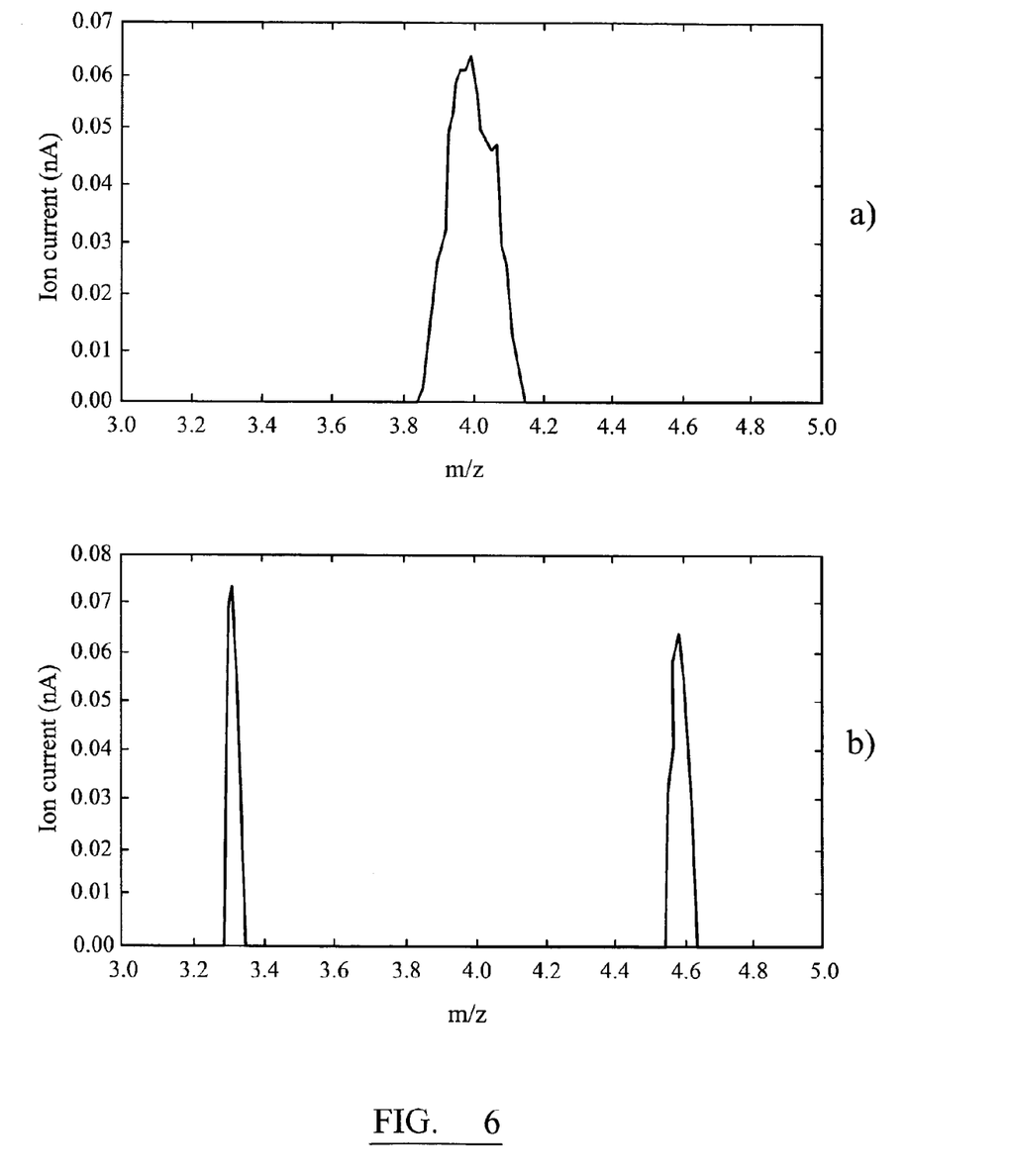
FIG. 6. Experimental mass peak for $^4He^+$ ions (a, top) and experimental mass spectrum for He/Ne gas mixture (b, bottom) obtained from the hyperbolic QMF.
Figure 11:
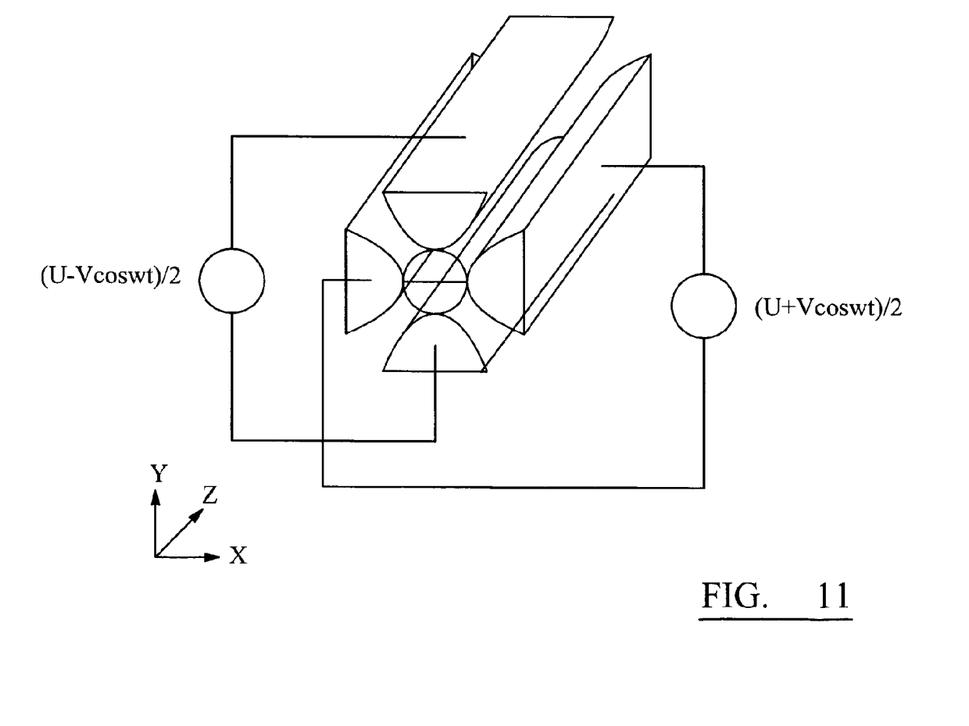
FIG. 11: A schematic illustration of the mutual disposition and electrical connectivity of the four electrodes of the QMF of the invention.

FIG. 5 shows the cross section of the assembly of the QMF with $r_0$=2 mm. An ideal hyperbolic electric field distribution shown in FIG. 8 may be set up by arranging the QMF according to the schematic illustration in FIG. 11. The plastic material of the housing is a good insulator. Grooves in the slot within the housing were fabricated with high accuracy so that the precision of electrode alignment was high. The thickness of the electrode coating was made to be sufficiently high to drive the QMF but it needs to be improved for conductivity and to reduce the amount of burn marks at the entrance side of the electrodes (see FIG. 5). FIG. 6*a* shows the experimental mass peak obtained from the QMF for $^4$He$^+$ ions with resolution of 25 at 50% of the peak height which is the maximum resolution achieved for these ions.

FIG. 6*b* shows the experimental mass spectrum for a 50:50 He/Ne gas mixture. The resolution for $^4$He$^+$ ions is 13 and the resolution for $^{20}$Ne$^+$ ions is 30 at 50% of the peak height. These are not maximum measured resolutions for these spectral peaks but resolutions that can be easily repeated each time when running the experiment. By making the electrode coating thicker, the resolution could be further improved for this particular design. Therefore, it can be concluded from the initial results that the operational principle has been proven and that the QMF is working as a mass spectrometer.

CONCLUSIONS

A hyperbolic QMF has been fabricated and shown to work as a mass spectrometer. The technique was found to be particularly suitable for implementing mass analyzers that provide ideal hyperbolic field or other devices with complex geometries.

EXAMPLE 2

Figure 9:
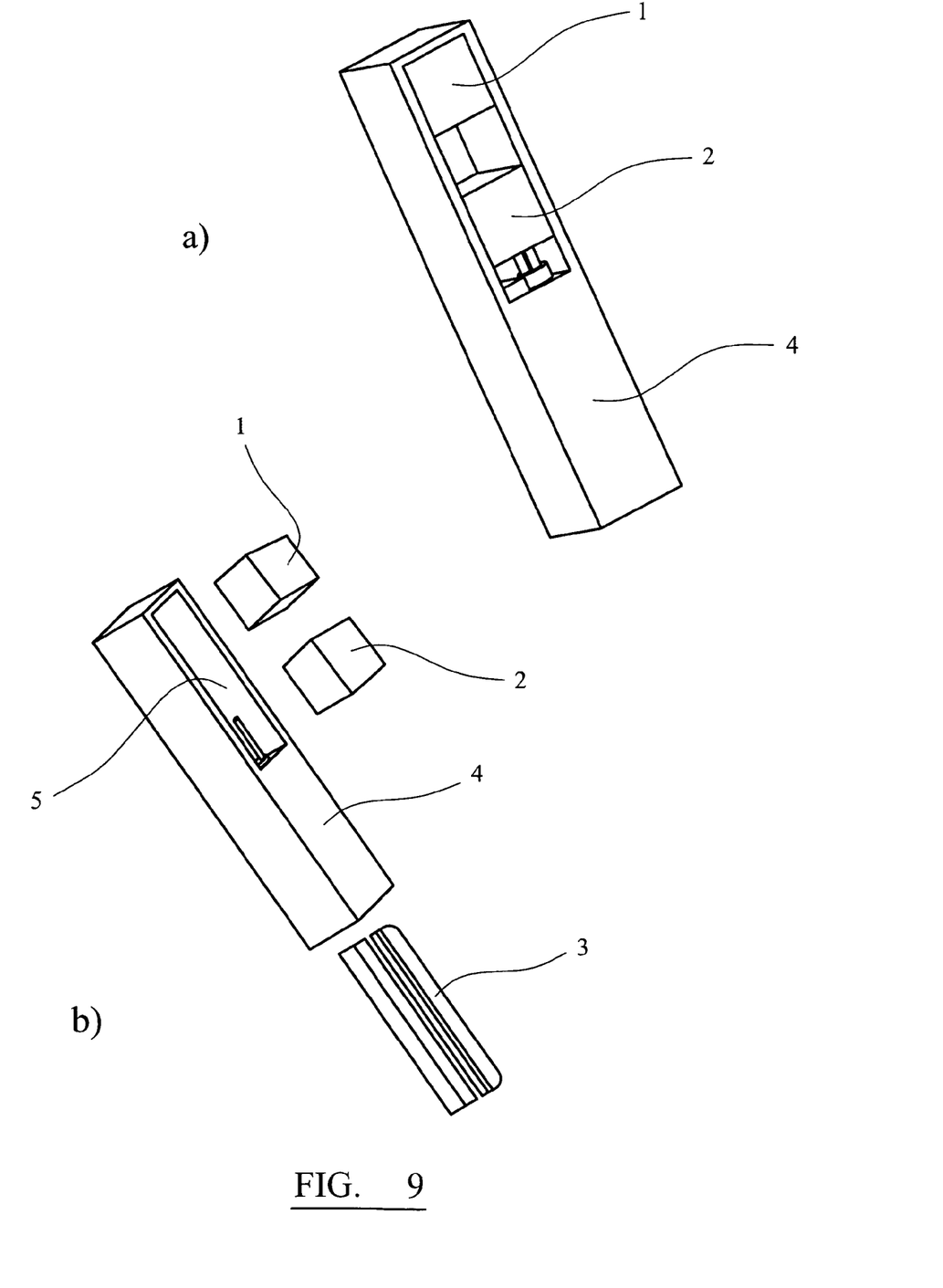
FIG. 9: (a) an assembled and (b) a disassembled view of an embodiment of the modular QMS assembly of the invention.

FIG. 9 illustrates (a) an assembled and (b) a disassembled view of an embodiment of the modular QMS assembly of the invention (components of which may be prepared according to the procedure outlined in Example 1). The assembly comprises four modules 1, 2, 3 and 4. Module 1 is an ion source. Module 2 is a lens array. Module 3 is four gold coated electrodes. Module 4 is an elongate housing.

Figure 10:
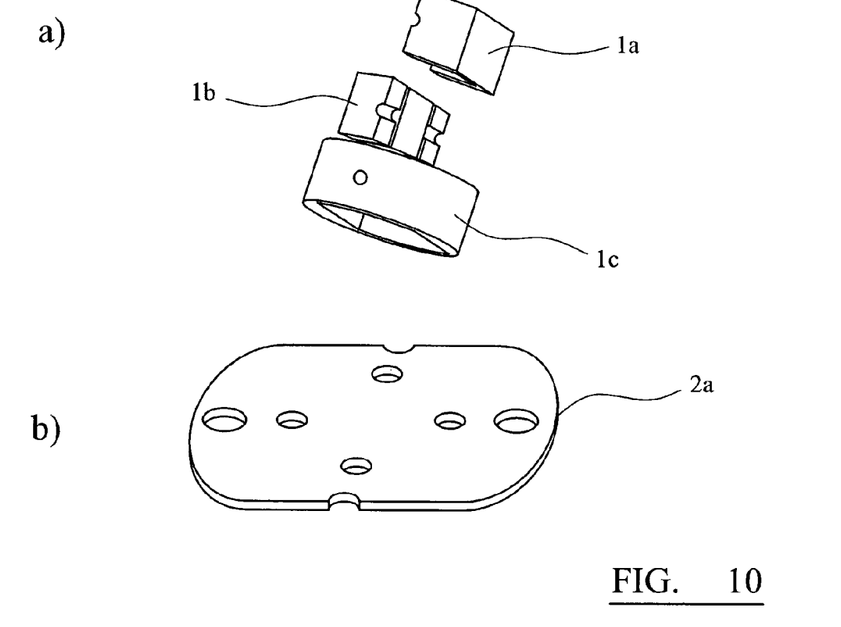
FIG. 10: Modules 1 and 2 of the embodiment of the modular QMS assembly of FIG. 9 in isolation.

Module 1 (the ion source) is received in a recess 5 in module 4 (the elongate housing) by a push fit in the x-y direction. Module 1 comprises twin coated plates 1*a*, 1*b* which are mounted spaced apart in a sub-housing 1*c* with a ceiling (see FIG. 10*a*).

Module 2 (the lens array) is received in the recess 5 in module 4 (the elongate housing) by a push fit in the x-y direction. Module 2 comprises four identical lenses 2*a* with an aperture of 400 microns which are mounted by locating pins to ensure aperture alignment (see FIG. 10*b*)

Module 3 (four gold coated electrodes) is received in the end of module 4 (the elongate housing) by a push fit in the z direction.

Module 4 (the elongate housing) is equipped with recess 5 and female hole and groove location points for each of modules 1, 2 and 3.

EXAMPLE 3

Figure 12:
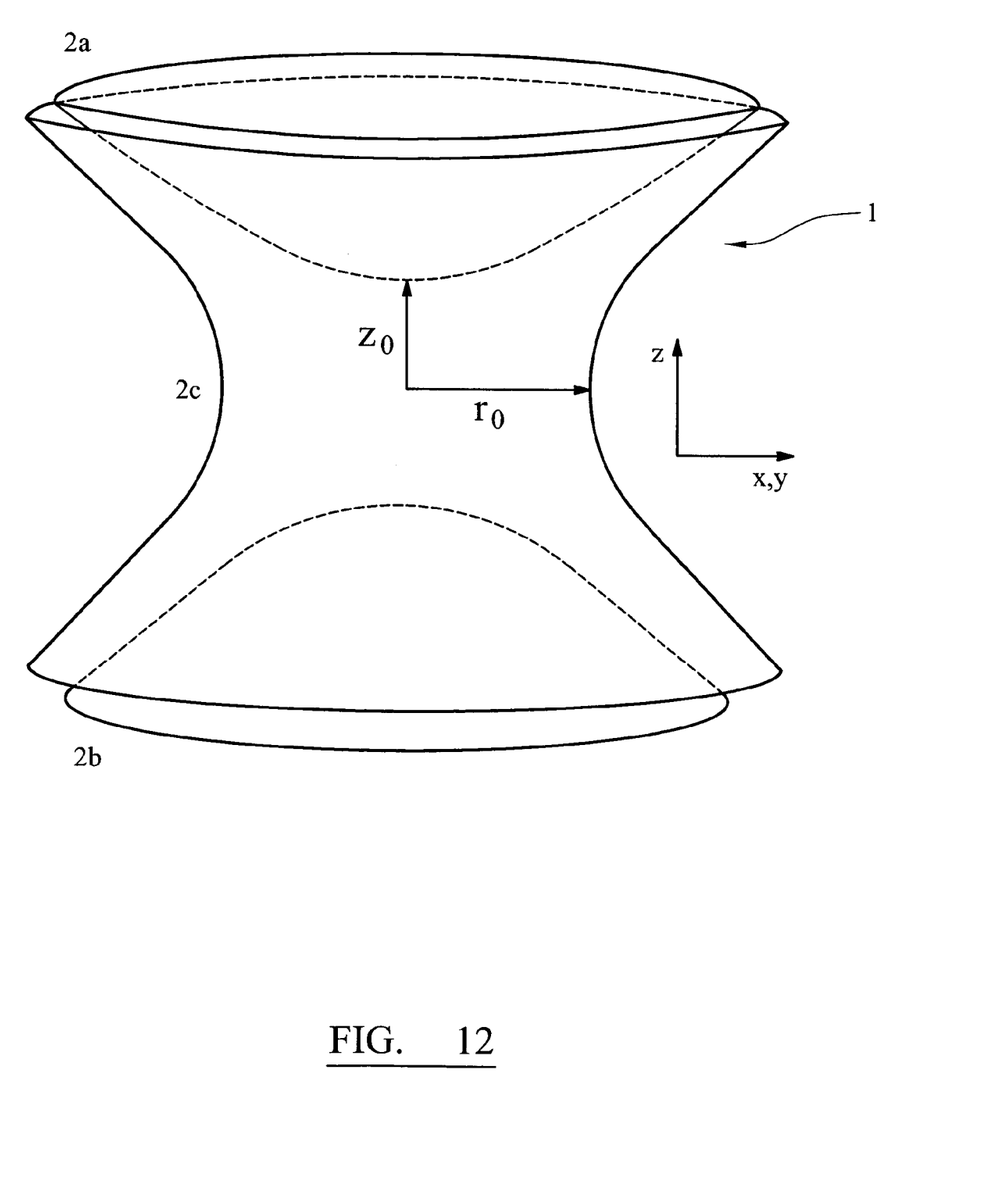
FIG. 12 illustrates a 3D quadrupole ion trap of the invention.

FIG. 12 illustrates a 3D quadrupole ion trap of the invention 1 which may be obtained according to an embodiment of the process of the invention. The 3D quadrupole ion trap 1 comprises a quadrupole of endcap electrodes 2*a*, 2*b* and a ring electrode 2*c*. The hyperbolic electrodes are represented by equations: $x^2-y^2=1$ or $y^2-x^2=1$ for hyperbola at the origin (x, y)=(0, 0).

Figure 13:
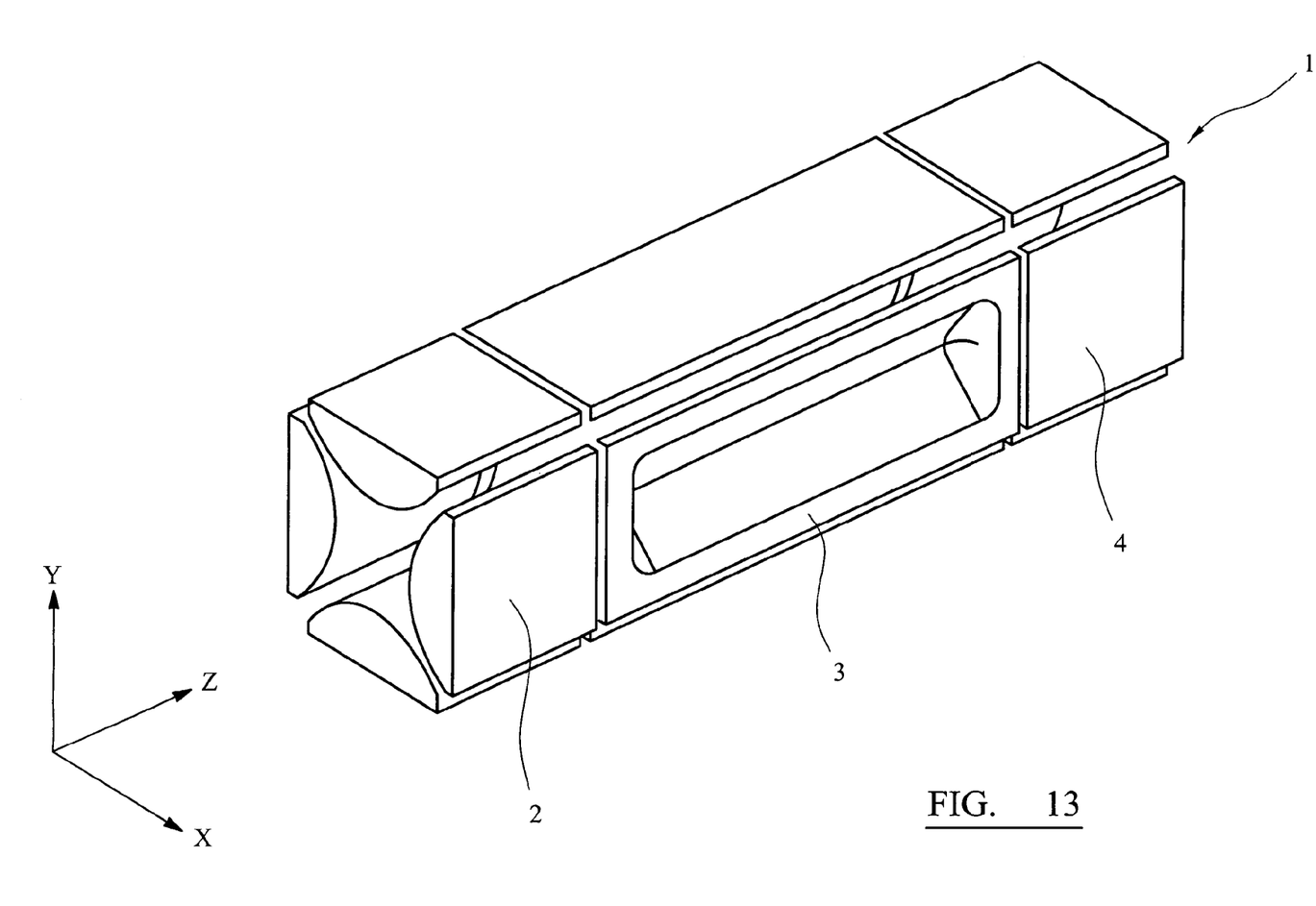
FIG. 13 illustrates a linear quadrupole ion trap of the invention.

FIG. 13 illustrates a linear quadrupole ion trap of the invention 1 which may be obtained according to an embodiment of the process of the invention. The linear quadrupole ion trap 1 comprises a quadrupole of front electrodes 2, centre electrodes 3 and rear electrodes 2*c*.

The invention claimed is:

1. A process for fabricating a quadrupole mass spectrometer (QMS) component comprising:
   (a) preparing a bed of curable material;
   (b) selectively exposing to incident radiation each of a plurality of x-y layers of the bed of curable material sequentially in the z-direction to produce x-y layers of selectively cured material which are characteristic of the x-y layers of the QMS component,
   wherein step (b) includes re-characterising sequentially the incident radiation commensurate with the sequential exposure of the plurality of x-y layers in the z-direction.

2. A process as claimed in claim 1 wherein step (b) is carried out by a source of radiation and a digital modulation device for modulating the radiation from the source of radiation in response to a digital image-carrying signal to output the incident radiation.

3. A process as claimed in claim 1 wherein the QMS component is one or more of an elongate rod, a securing pin, a quadrupole mass filter (QMF), an ion source, an ion collector, an ion detector, a QMF pre-filter, a pre-filtered mass analyzer, an ion trap, an array of mass analyzers, an ion source lens, a housing or a component of any of the aforementioned.

4. A process as claimed in claim 1 wherein the QMS component is a QMF composed of a housing portion and four elongate electrode portions parallel and mutually spaced apart in the housing portion.

5. A process as claimed in claim 1 wherein the QMS component is a quadrupole ion trap.

6. A process as claimed in claim 1 wherein the QMS component is an elongate rod.

7. A process as claimed in claim 6 wherein the profile of the elongate rod is at least partially substantially hyperbolic.

8. A process as claimed in claim 1 wherein the QMS component is a housing comprising: an elongate slot in which a plurality of elongate rods are parallel mountable axially in a mutually spaced apart disposition so as to define therebetween an ion receiving volume.

9. A process as claimed in claim 8 wherein in the elongate slot are parallel mountable axially a plurality of elongate rods in a mutually spaced apart disposition whereby a first part of each elongate rod is freely inward facing and a second part of each elongate rod is adapted to key to a part of the circumference of the elongate slot in the housing.

10. A process as claimed in claim 1 wherein the QMS component is a housing comprising: an elongate slot in which four elongate rods are parallel mountable axially in a mutually spaced apart disposition so as to define therebetween an ion receiving volume.

11. A process as claimed in claim 10 wherein in the elongate slot are parallel mountable axially four elongate rods in a mutually spaced apart disposition whereby in use to generate in the ion receiving volume a hyperbolic electric field.

12. A process as claimed in claim 10 wherein in the elongate slot are parallel mountable axially four elongate rods in a mutually spaced apart disposition whereby a first part of each elongate rod is freely inward facing, wherein the profile of the first part of each elongate rod is substantially hyperbolic and the second part of each elongate rod is adapted to key to a quadrantal circumference of the elongate slot in the housing.

13. A process as claimed in claim 1 used to fabricate a QMS per se composed of one or more QMF portions.

14. A process as claimed in claim 1 further comprising:
(c) slotting a plurality of elongate rods prepared consecutively by steps (a) and (b) in the elongate slot of a housing prepared by steps (a) and (b).

15. A process as claimed in claim 14 wherein step (c) further comprises:
(c1) inserting a securing pin prepared by steps (a) and (b) through a radial bore in the housing into a radial bore in the elongate rod to secure the elongate rod in the housing.

16. A process as claimed in claim 14 further comprising:
(d) depositing a coating of a conducting material on the surface of each elongate rod to render the elongate rod conductive.

* * * * *